May 1, 1934.  C. G. J. BRIQUET ET AL  1,957,384
MULTIPLE CHAMBER TIRE
Filed April 14, 1931
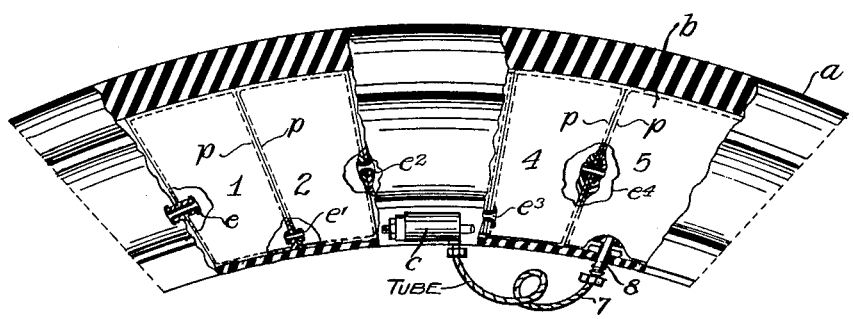

Patented May 1, 1934

1,957,384

UNITED STATES PATENT OFFICE 1,957,384

MULTIPLE CHAMBER TIRE

Corneil Guillaume Joseph Briquet and Alexis Ewdokimovitsch Dmitrieff, Vilvorde, Belgium Application April 14, 1931, Serial No. 530,121
In Belgium January 22, 1931

1 Claim. (Cl. 152—22)

This invention relates to multiple chamber tires, and it comprises an outer casing, an inner casing composed of a series of relatively small pockets, of rubber, abutting against one another, fittings in the abutting walls of adjacent pockets throughout the series, the successive fittings being out of line with one another and each fitting having a fine perforation permitting slow leakage from pocket to pocket, whereby upon deflation of one pocket by reason of a puncture, the walls of the adjacent unpunctured pockets may move against the walls of the intermediate sections and the latter walls will close the perforations in the fittings of said adjacent sections.

In the accompanying drawing, $a$ indicates an outer tire or casing and $b$ indicates an inner tube or casing of rubber, divided by walls or partitions $p$ into a series of relatively small pockets, several of which are indicated at 1, 2, 4 and 5. Extending through the adjacent walls of adjacent pockets are eyelets, indicated at $e$, $e'$, $e^2$, $e^3$ and $e^4$, each eyelet having a relatively small opening to permit slow leakage of air from pocket to pocket. The eyelets in the opposing walls of each pocket are out of line with one another, as shown.

In operation, in case of a puncture in one pocket, and consequent deflation of that pocket, as for instance the pocket 2, the pressure in the other pockets of the series will cause the pocket 1 to deflate slowly through eyelet $e'$ and the pressure in the tube will cause the eyelets $e$ and $e^2$ to approach and be pressed against the partition between the pockets 1 and 2, which will close the perforations in the eyelets $e$ and $e^2$ and prevent further leakage from the tire.

If desired, a signalling device $c$ may be connected through tubing 7 and a suitable fitting 8 to a pocket in the inner tube, to indicate low pressure, but this device is not a part of the invention claimed in this application and therefore need not be further described.

What I claim is:

A vehicle tire comprising an outer casing, an inner casing comprising a series of relatively small closed pockets, of rubber, abutting against one another, and fittings extending through the abutting walls of adjacent pockets throughout the series, each fitting having a fine perforation therethrough permitting slow leakage of air from pocket to pocket, and the fitting in one wall of each pocket being out of line with the fitting in the opposing wall, whereby, upon puncture and deflation of one pocket, the walls of the adjacent unpunctured pockets, having fittings with alined perforations, may move against walls of the intermediate sections and the latter walls will close said alined perforations.

CORNEIL GUILLAUME JOSEPH BRIQUET.
ALEXIS EWDOKIMOVITSCH DMITRIEFF.